Dec. 13, 1938.   W. K. BURGESS   2,139,670
TURN-BANK AND POSITION INDICATOR
Filed Feb. 21, 1933   2 Sheets-Sheet 1
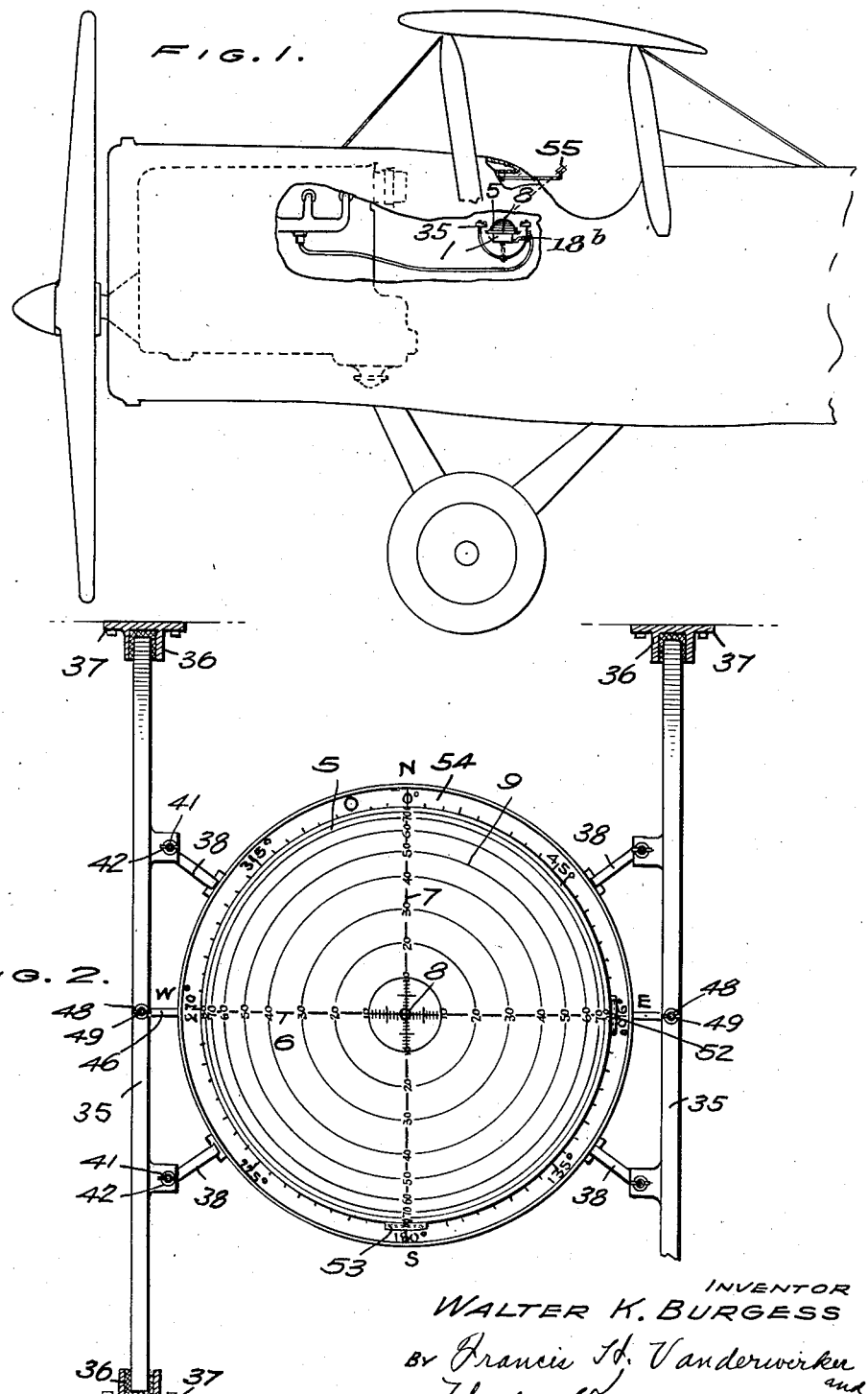
INVENTOR
WALTER K. BURGESS
BY Francis H. Vanderwerken
and
Wade L. Koontz
ATTORNEYS

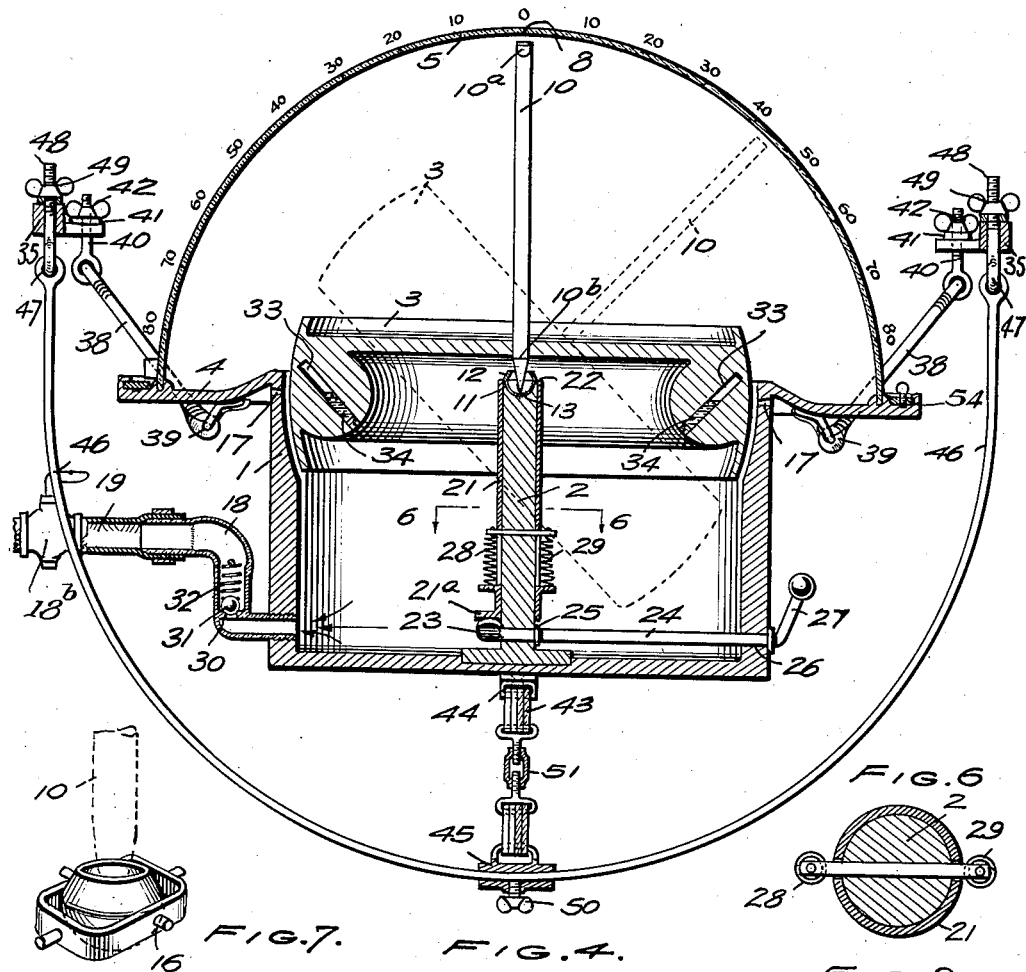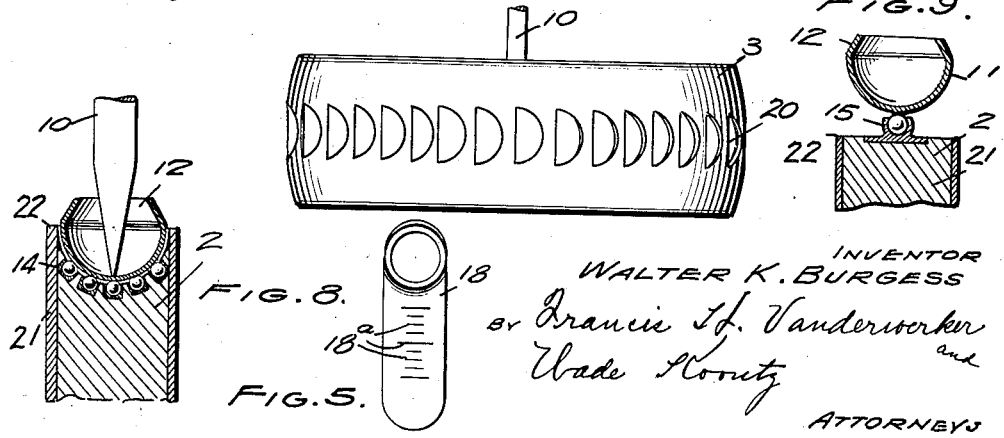

Patented Dec. 13, 1938

2,139,670

UNITED STATES PATENT OFFICE 2,139,670

TURN-BANK AND POSITION INDICATOR

Walter K. Burgess, Chanute Field, Rantoul, Ill.

Application February 21, 1933, Serial No. 657,834

17 Claims. (Cl. 33—204)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to aircraft navigational instruments and the principal object of the invention is to provide an improved gyrostatic turn-bank-and-position indicator by the use of which a pilot is enabled to ascertain his position relative to the earth's surface at all times.

A further and most essential object of the invention is to eliminate the objectionable features characteristic of, and inherent in all, previous types of second degree gyros, or gyros of the spinning top type, the deflection of which from the true vertical or perpendicular during certain movements of the aircraft gives a false indication and, hence, renders the device unreliable.

Other important objects of the invention are to provide improvements in the mounting of the instrument and in the gyro bearing, and in the manner of driving the gyro.

In addition to the foregoing, the invention also provides means of translating the amount of bank into compass degrees or bearings.

The accompanying drawings illustrate a practical embodiment of the invention wherein:

Figure 1 is a side view of an airplane fuselage broken away to disclose the manner of applying the invention thereto;

Figure 2 is a top plan view of the invention.

Figure 3 is a vertical cross section thereof on an enlarged scale;

Figure 4 is a detail view of the gyro wheel;

Figure 5 is a detail view of the safety valve unit tube;

Fig. 6 is a cross section on line 6—6 of Fig. 3; and

Figs. 7, 8 and 9 are detail views of modified forms of gyro cup bearings.

This device includes a gyro instrument case 1 having a central bearing post or pedestal 2 upon which the gyro rotor 3 is mounted for rotation about a perpendicular axis. Extending over the gyro and suitably supported upon the flange 4 of the case is a glass dome or top 5. The top 5 is a true hemisphere and is marked off, preferably with radium paint, with lines 6 and 7 corresponding to the fore-and-aft and the beam or athwart ship lines, respectively, of the aircraft. These lines, as hereinafter explained, aid in properly locating the instrument relative the aircraft fuselage when installing same. The top 5, in addition to carrying the fore-and-aft and the beam lines, is also marked with a center point 8 and parallel, or lines of latitude, 9 at ten degree intervals from zero to ninety degrees.

This gyro 3 is of the spinning top type and includes a heavy body or wheel mounted for rotation, by means of the gyro spindle 10, in a horizontal plane. The upper or indicator portion of the gyro spindle 10 serves, by its angular position relatively to the central or zero point of the calibrated glass dome to indicate the position of the aircraft with reference to the surface of the earth and for convenient reading of the instrument during night flying the index or pointer end 10a of the spindle is coated with radium and thus rendered visible in the dark. When the zero on the calibrated glass dome shows exactly above the rubber tipped pointer 10a, the aircraft is riding on an even keel fore-and-aft and athwartships. When the aircraft is making a bank or turn, the direction and nature of the maneuver will be indicated by the position of the pointer relative to the center of the dome and to the fore-and-aft and beam lines of the dome. The lower or bearing end 10b of the gyro spindle is shaped to a needle point and rests in a true hemispherical bearing-cup 11 supported at the upper end of the bearing post 2 of the case.

The bearing-cup 11 is provided at its equator with a concentric ring or hook 12 sloping upward and toward the center at about a sixty degree angle to form a guard rim. The purpose of this guard rim is to prevent the gyroscope bearing-point 10b from jumping out of the bearing cup 11 when the gyro spindle 10 is heeled over, relatively to the bearing-cup, to seventy degrees or greater. In Fig. 3 the bearing-cup 11 is shown fixedly mounted within a socket or recess 13 in the upper end of post 2. It may, however, be so mounted as to have universal movement relative to the post, permitting the gyro and indicator spindle to heel over to ninety degrees. For example, the bearing-cup may be supported on ball bearings as shown at 14 in Fig. 8, or it may be mounted on a small universal joint platformed in the post 2 as shown at 15 in Fig. 9, or it may be hung in rings or gimbals as shown at 16 in Fig. 7.

It is the conventional practice to operate the gyrostat by the suction of a Venturi or Pitot tube. For the purpose of the present invention, however, the gyro 3 is operated by the suction within the motor intake manifold. The case 1 is air-tight except for a plurality of small air-inlet ports or air-jet openings 17 located in the upper portion of the case and an outlet tube 18 having an upwardly turned portion located adjacent the bottom of the case. The outlet tube 18 is of glass or other transparent material and is connected by a hollow wire or flexible hose 19 to the intake manifold of the motor. When the motor is operating, a suction is created in the hose 19, glass tube 18, and case 1, causing the air to be drawn out of the case. The air forced into the case by atmospheric pressure through the air-jet openings 17 impinges the small grooves or buckets 20 on the periphery of the gyro 3 and causes the latter to spin or revolve about its axis. It has beeen found that with this arrangement the gyro rotor will continue to revolve and function for about fifty minutes more or less, after the driving forces or the motor is stopped, unless damped with the gyro stop brake.

The gyro stop brake comprises a sleeve 21 slidably mounted on the post 2 for movement longitudinally thereof with its upper or braking end 22 adapted, in the raised position of the sleeve, to engage the gyro for lifting the same off the post 2 until the rubber-tipped end 10a of the gyro pointer 10 presses against the glass dome 5 and by reason of its binding contact therewith prevents any relative movement between the dome and the gyro. The raising or lifting of the braking sleeve is effected by a cam or eccentric 23 fixed on or made an integral part of the end of a rotatable shaft or operating rod 24 and acting against the cam follower or foot-piece 21a of the sleeve. The member 24 is journaled crosswise of the gyro instrument case 1 and has an inner bearing 25 in the post 2 and an outer bearing 26 in the side wall of the case. The member 24 is also provided, exteriorly of the case, with a crank 27 by means of which the member is rotated to cause the high part of the cam or eccentric 23 to exert an upward camming action or lift on the sleeve-foot 21a, the said cam or eccentric being adapted upon rotation thereof subsequent to the initial contact of the pointer with the dome shaped member, to become jammed between the sleeve and the axial support of the cam for holding the rotor and the housing in relatively fixed relation until manually released. Suitable retracting means, such as springs 28 and 29, are employed to return the sleeve and cam to their normal lowermost positions in the absence of any braking pressure being applied thereto, the upper ends of the springs being secured to a cross pin mounted to extend transversely through the pedestal and the lower ends of the springs being suitably connected to the sleeve; the latter having longitudinally disposed slots to receive, and provide clearance for, the ends of the cross pin during the up-and-down movement of the sleeve.

The glass tube 18 forms part of a control and safety valve unit and is provided with a valve seat 30 upon which a ball valve 31 is normally retained by the pressure of a spring 32. As soon as the suction starts, the ball valve 31 is lifted, due to the vacuum in case 1, and by reason of being visible through the glass tube enables the pilot by noting the lift of the valve to ascertain if the device is functioning with the full vacuum or driving force. Should the motor stop or backfire, the ball-valve 31 is promptly seated by the pressure of the spring 32, closing the tube 18 and preventing the entrance of any gas into the case 1. The ball and glass tube are preferably provided with radium paint outlines and graduations for purposes of illumination and visibility during night flying. The graduations of the tube are shown at 18a in Fig. 5. The tube 19 is provided with a manually adjustable valve 18b whereby the amount of suction or minus pressure induced in the vacuum line to the gyro casing, by reason of tapping the engine intake manifold, may be controlled and kept constant at varying atmospheric densities.

It has been found by experimentation that where the center of mass and the center of gravity exactly coincide in a perpendicular or spinning top of gyro, the latter is not sensitive and will not indicate the perpendicular but will obey the forces exerted upon it somewhat similar to a sphere of homogenous material. It has no well defined axis about which it may spin in a perpendicular manner. On the other hand, if the center of mass and the center of weight cannot be made to closely approach each other a gyro of the spinning top type is too sensitive to vibration for practicable and feasible use as a turn bank position indicator on aircraft. Only gyroscopes of the second order can be used but these must be inherently modified in order to function in a practical manner. Non-recognition of this fact in all previous attempts to use this type of gyro for this purpose has resulted in failure to provide suitable correction for the resultant errors.

The structure shown in Figure 1 discloses means for controlling and making possible the use of a second degree, or spinning top type, gyro and applying it successfully to the work of indicating and showing the exact position of an aircraft in relation to the earth's surface and at the same time shearing it of the objectionable features inherent in it as applied in prior art practice. With this end in view, the gyro 3 is provided, in its circumference, with small channels or tubes 33 which are inclined at an angle, between zero and ninety degrees, upward and outward from the perpendicular axis of the gyro top. These tubes contain an amount of fluid or mobile weight 34, such as mercury or steel balls. Their function is to provide means whereby the center of mass and the center of gravity proportionally approach but do not quite ever coincide during the variable speed rotation of the gyro top. As soon as the gyro obtains motion of a certain speed or beyond, the liquids or weights are caused, by centrifugal force, to rise in the inclined tubes, thereby raising the center of gravity and causing the center of mass and the center of gravity to more nearly coincide. The variable by which these two centers fail to exactly coincide depends, within limits of the structure, upon the speed of the gyro top. By this means a gyroscope of two degrees of freedom is brought near to three degrees of freedom when in operation.

The term "two degrees of freedom" and "three degrees of freedom" are here used respectively to designate gyroscopes capable of equal rotation in the plane of either two or three of their axes. Only gyroscopes of two degrees of freedom can be used to indicate direction whether mounted perpendicularly or horizontally in relation to the earth's surface. By approaching a condition near three degrees of freedom, the oscillations inherent in all gyroscopes of two degrees of freedom due to any and all pressures, vibrations, or forces exerted at a right angle to the gyroscope rotor and bearing are greatly minimized. In other words, the means disclosed provide in a gyroscope of two degrees of freedom required in order that it may indicate turns and banks, means of reducing to a minimum the undesirable attribute of a gyroscope of such type; i. e., its sensitiveness to vibration.

The mounting of the instrument consists of two parallel wood or metal bars or brackets 35 extending across the aircraft fuselage far enough in front of the pilot's control stick to prevent any interference with the proper operation of the latter. The ends of the brackets are pillowed in crepe rubber blocks or pneumatic or other shock absorbing devices 36 secured to the sides of the fuselage in plywood cups 37. The gyro case 1 is suspended by four elastic bands 38, the lower ends of which are secured to eyes or rings 39 attached at opposite equatorial points on the gyro case. These elastic bands are also individually secured at their respective upper ends, within the eyes of eye bolts 40; the shanks of which extend through the brackets 35 and are engaged by a crepe rubber washer 41 and a thumb nut 42. The thumb nut is screwed on the eye bolt shank from above the support bracket and provides means for raising and lowering the eye bolt in regulating or exactly equalizing the tension in each and all of the four elastic bands 38. An additional and larger elastic band 43, of a tension approximately four times that of either one of the bands 38, is attached at its upper end to an eye or ring 44 depending from the exact bottom center of the instrument case. The lower end of this strap is secured to the eye or ring of a fitting 45 slidably mounted on the arc of a supporting bail 46 depending below the case and crosswise of the supporting bars 35. The ends of the bail are hingedly connected at 47 to adjustment bolts 48 the shanks of which extend upwardly through the bars 35 from the undersides thereof and are engaged by adjusting thumb nuts 49. The fitting 45, being slidable on the bail, permits of fore-and-aft adjustment and a locking screw 50 having binding engagement with the bail is provided on the fitting to lock it in any position to which it is adjusted. A small turn-buckle 51 connects adjacent sections of the elastic band 43 and provides means for shortening or lengthening the band to exactly equalize, or to vary, the tension between the normally stronger lower elastic band 43 and the four weaker upper elastic bands 35. These five elastic bands absorb the vibration of the airplane and do not transmit the same to the instrument. They also fix the position of the instrument relative to the ship's fuselage with the latter in flying position. The instrument should be so mounted, when installed and fixed in the fuselage, that the fore-and-aft and the beam lines 6 and 7 marked on the glass dome of the instrument exactly coincide with the fore-and-aft axis and the beam axis of the craft. As an aid to the adjustment means of the tensional supporting strap, and to further facilitate the proper installation and lining up of the instrument relative to the fuselage, the instrument case is equipped with two small spirit levels 52 and 53, the former on the fore-and-aft line 6 of the instrument and the latter on the beam line 7. This mounting functions to completely damp out the effects of motor, fuselage, and flying vibration on the gyro rotor.

The invention may also embody means of translating the amount of bank into compass degrees or bearings. It is understood, in this connection, that an airplane, on a bank, has a tendency to turn in a corresponding proportion to its bank and will turn unless such tendency is intentionally corrected against by manipulation of the rudder causing the craft to slide, slip or skid. This would include a rotatable azimuth circle or graduated ring 54 mounted about the equatorial line of the true hemispherical glass dome or cover and rotatably adjustable so that proper compensation can be made for east and west declination. When the instrument is mounted on or parallel to the fore-and-aft line of the airplane, and the pilot's observation sight or eyepiece 55 to the instrument and the instrument are placed in proper relation to each other the instrument may then be used to a limited extent as a compass. This is made possible by providing one fixed observation sight or eyepiece 55 over the lubber line on the compass represented by the fore-and-aft line 6 of the instrument. As soon as the airplane banks, the amount of deviation from its true course may then be shown in degrees to the pilot by looking through the eyepiece or sight 55 and over the tip of the gyro indicator pointer 10 and on across this azimuth circle. This compass feature is of material value in fog and in heavy rain and provides means for showing to the pilot not only his position in relation to the earth's surface but at the same time translating any bank of such positions into the exact number or turn degrees he is consequently flying to the right or left of his true course.

This instrument is intended primarily for use on large bombing and heavy commercial transport planes.

I claim:

1. A turn-bank and position indicator for aircraft comprising a gyroscope rotor having an indicator spindle and being rotatable in a horizontal plane to maintain the spindle vertical, a casing supporting the rotor and being inclinable to and rotatable about the rotor without disturbing the verticality of the spindle, a hemispherically curved transparent cover on said casing having radial lines of graduations cooperating with the spindle to indicate the inclination of the casing relative to the spindle, one of said radial lines serving as a lubber line, a compass ring encircling the said hemispherical cover at its equator, and a pilot's observation sight over the said lubber line and fixed with reference to the casing and cover for sighting over the indicator spindle to the said compass ring.

2. In a gyro inclinometer for use on aircraft, the combination of a casing having air intake ports and an air outlet, a gyroscope rotor mounted in said casing to be rotated by the energizing force of air drawn through the casing, and means for drawing air through the casing including a suction conduit in communication with the air outlet of the casing, said conduit having an upwardly turned transparent portion enclosing a ball valve and having graduations marking various points in the lift of the valve.

3. In a gyro inclinometer in which the energizing force is derived from an internal combustion engine, the combination of a suction operated gyroscope rotor, a casing in which said rotor is mounted to spin, said casing having air intake ports for directing air to drive said rotor and having also a suction conduit adapted to be connected with the intake manifold of the engine, a suction operated valve seated in said suction conduit and normally closing the passage through the conduit, said valve being displaced from its seat to open the passage by and substantially in proportion to the suction induced in the passage during the operation of the engine, and means visibly indicating the valve displacement and, hence, the efficiency of the energizing force.

4. In a gyro inclinometer in which the energizing force is derived from an internal combustion engine, the combination of a suction operated gyro rotor, a casing in which said rotor in mounted to spin, said casing having air intake ports for directing air to drive said rotor and having also a suction conduit adapted to be connected with the intake manifold of the engine, a spring-tensioned suction-operated valve mounted within said conduit for opening and closing the passage through the conduit, said valve being displaced from its normal passage closing position and against the resistance of its spring tension to open the passage by and substantially in proportion to the suction induced in the passage during operation of the engine and being seated by its pressure of its spring tension to close the passage and prevent the entrance of gas into the casing when and if the engine stops or backfires, and means for visibly indicating the valve displacement and thereby providing a gauge by which the efficacy of the energizing force can be ascertained at all times.

5. In a gyro inclinometer, the combination of a suction operated gyroscope rotor, a casing in which said rotor is mounted to rotate, said casing having air intake ports adjacent said rotor for directing air to drive said rotor, means for withdrawing air from said casing including a suction conduit having a valve housing in communication with said casing and a spring tensioned suction valve within the housing for opening and closing the passage through the conduit, said valve housing being transparent to permit observation of the valve movement and having graduations marking various points in the lift of the valve.

6. In a gyro inclinometer, a gyroscope housing having a pedestal with a cup-shaped bearing at its upper end, a dome shaped scale member mounted in a fixed relation to the pedestal, a gyroscope rotor having a bearing point resting in said cup-shaped bearing and free to travel about the inside surface of the bearing, a pointer extending upwardly of the said rotor in prolongation of the axis of rotation of the rotor, said pointer having its upper end normally spaced from the said dome shaped scale member, means to rotate the said rotor, and means operable to lift and support the rotor upwardly of the pedestal sufficiently to cause the upper end of the pointer to contact the dome shaped scale member and thereby act as a brake for stopping the rotation of the rotor.

7. In a gyro inclinometer, a gyroscope housing having a pedestal with a cup shaped bearing at its upper end, a dome shaped scale member mounted in a fixed relation to the pedestal, a gyroscope rotor having a spindle rotating in said bearing with a weighted structure connected to the spindle, the spindle extending upwardly and forming a pointer, means to rotate the rotor, a sleeve slidably mounted on said pedestal and operating means extending through the pedestal and connected to the sleeve to shift said sleeve upwardly, such upward shift of the sleeve bringing the upper end of the pointer in contact with the dome shaped member and restraining the rotation of the rotor by the said sleeve engaging the rotor.

8. In a gyro inclinometer, a gyroscope housing having a pedestal with a cup shaped bearing at its upper end, a dome shaped scale member mounted in a fixed relation to the pedestal, a gyroscope rotor having a spindle rotating in said bearing, the spindle extending upwardly and forming a pointer, means to rotate the rotor, and means for stopping the rotation of the rotor including a sleeve slidably mounted on said pedestal and shiftable upwardly against the underside of the rotor, a cam adjacent to and rotatable against the lower end of the sleeve for shifting the sleeve and rotor upwardly until the upper end of the pointer is in contact with the dome shaped scale member and restrains rotation of the rotor, and means for rotating the cam.

9. In a gyro inclinometer, a gyroscope housing having a pedestal with a cup shaped bearing at its upper end, a dome shaped scale member mounted in a fixed relation to the pedestal, a gyroscope rotor having a spindle rotating in said bearing with a weighted structure connected to the spindle, the spindle extending upwardly and forming a pointer, means to rotate the rotor, a sleeve slidably mounted on said pedestal, and operating means extending through said pedestal and engaged with said sleeve to shift said sleeve upwardly a distance sufficient to cause the upper end of the sleeve to engage the underside of the rotor and to bodily lift the same until the upper end of the pointer contacts with the dome shaped member and restrains the rotation of the rotor.

10. In a gyro inclinometer, a gyro of the spinning top type having a downwardly extending bearing point on which it is adapted to spin, and an upwardly extending pointer, a housing enclosing said gyro, said housing having a pedestal provided with a bearing in which said bearing points rotate and also having a dome shaped scale member mounted in a fixed relation to the said pedestal and spaced above the said pointer, means to rotate the said gyro, and means to stop the rotation of the rotor including a sleeve slidably mounted on said pedestal and engageable with the underside of the rotor when moved upwardly, a rotatable shaft extending transversely through the pedestal, means for rotating said shaft, and a cam bearing against a portion of said sleeve and fixed relatively to the shaft for rotation therewith, said cam when rotated exerting such a camming action against the sleeve as to effect such an upward shift of sleeve, rotor and pointer as will bring the upper end of the pointer in contact with the dome shaped member and restrain the rotation of the rotor.

11. In a gyro inclinometer, a gyro of the spinning top type having a downwardly extending bearing point and an upwardly extending pointer, a housing enclosing said gyro and having a pedestal bearing in which the gyro bearing point rotates and also having a dome shaped scale member mounted in a fixed relation to said pedestal and spaced above the said pointer, means to rotate the gyro, and means to stop the rotation of the gyro including a sleeve slidably mounted on said pedestal and a rotatable shaft extending transversely through the pedestal and having a cam portion in contact with the sleeve and adapted upon rotation of the shaft to move the sleeve into lifting abutment with said rotor to shift the latter and the pointer upwardly to bring the upper end of the pointer in contact with the said dome shaped member, said cam being adapted upon rotation thereof subsequent to the initial contact of the pointer with the dome shaped member to become jammed between the sleeve and the axial support of the cam for holding the rotor and the housing in relatively fixed relation.

12. In a gyro inclinometer, a gyroscope housing having a pedestal and a dome shaped scale member mounted above and in a fixed relation to the pedestal, a gyroscope rotor mounted to spin on said pedestal and having an upwardly extending pointer, means to rotate said rotor, a sleeve slidably mounted on said pedestal and having longitudinal slots, a cross pin in said pedestal extending into the slots of the sleeve, elastic connections between the sleeve and the cross pin operating to yieldably resist the upward movement of said sleeve, and means for shifting the sleeve upwardly and against the resistance of the elastic connections sufficiently to cause the pointer to contact the dome shaped member and restrain the rotation of the gyro.

13. In a gyro inclinometer, a gyro rotor of the spinning top type, a casing enclosing the rotor and having a bearing pedestal on which said rotor is mounted to rotate, means for rotating said rotor, a sleeve slidably mounted on the pedestal and shiftable longitudinally thereof to place its upper end into and out of frictional contact with the underside of the rotor to stop the rotation of the latter, and a rod journaled crosswise in said pedestal and below the sleeve, said rod having an eccentric portion engaging and supporting the sleeve at its lower end and adapted upon rotation of the rod to shift said sleeve against the said rotor, and means for rotating the said rod.

14. In a gyro inclinometer, a gyro rotor of the spinning top type, a casing enclosing the rotor and having a bearing pedestal on which the rotor is mounted to rotate, means to rotate the rotor, a sleeve slidably mounted on the pedestal and shiftable longitudinally thereof to place its upper end into and out of frictional contact with the underside of the rotor to stop rotation of the latter, an operating rod extending transversely through the pedestal at a point below the lowermost position of the sleeve and being movable relatively to the said pedestal, said rod having a portion thereof in contact with the lower edge of the sleeve and shaped to give an upward camming action on the sleeve when the said operating rod is moved, and means for moving said rod.

15. In a gyro inclinometer, a housing having a bearing pedestal, a dome shaped transparent scale member mounted in a fixed relation to the pedestal, a gyro rotor having a point bearing on said pedestal, a pointer integral with and extending upwardly of the said rotor with its upper end normally spaced from the said scale member, said pointer having its upper end tipped with an anti-slip substance, means to rotate said rotor and means operable to lift said rotor while rotating upwardly of the pedestal sufficiently to cause the tipped end of the pointer to frictionally engage the scale member with a binding contact restraining the rotation of the rotor.

16. In a device as described, a gyroscope rotor, a bearing structure in which said rotor is mounted, the bearing structure having a plurality of brackets connected thereto, and a fixed member having a plurality of cups each with a packing material, the brackets fitting in said packing material and forming a mounting for the bearing portion of the gyroscope.

17. In a device as described, a gyroscope housing having a pedestal with a cup-shaped bearing at its upper end, a sleeve slidably mounted on said pedestal, a gyroscope rotor having a spindle rotating in said bearing with a weighted structure connected to the spindle, the spindle extending upwardly and forming a pointer, a dome-shaped scale member mounted in a fixed relation to the pedestal, means to rotate the rotor and an operating rod extending through the pedestal and connected to the sleeve to shift said sleeve upwardly, such upward shift of the sleeve bringing the upper end of the pointer in contact with the dome and restraining the rotation of the rotor by the said sleeve engaging the rotor.

WALTER K. BURGESS.